(12) United States Patent
Seo et al.

(10) Patent No.: US 9,264,204 B2
(45) Date of Patent: Feb. 16, 2016

(54) METHOD AND APPARATUS FOR INTER-CELL INTERFERENCE COORDINATION FOR TRANSMISSION POINT GROUP

(75) Inventors: Hanbyul Seo, Anyang-si (KR); Kijun Kim, Anyang-si (KR); Byounghoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 68 days.

(21) Appl. No.: 14/238,670

(22) PCT Filed: Aug. 16, 2012

(86) PCT No.: PCT/KR2012/006499
§ 371 (c)(1),
(2), (4) Date: Feb. 12, 2014

(87) PCT Pub. No.: WO2013/025051
PCT Pub. Date: Feb. 21, 2013

(65) Prior Publication Data
US 2014/0211734 A1    Jul. 31, 2014

Related U.S. Application Data

(60) Provisional application No. 61/524,743, filed on Aug. 17, 2011.

(51) Int. Cl.
*H04W 4/00* (2009.01)
*H04L 5/00* (2006.01)
(Continued)

(52) U.S. Cl.
CPC .............. *H04L 5/0073* (2013.01); *H04B 7/024* (2013.01); *H04B 7/026* (2013.01); *H04B 7/0639* (2013.01);
(Continued)

(58) Field of Classification Search
CPC .............. H04W 52/00; H04W 52/346; H04W 72/1278; H04L 5/0073; H04L 5/0035; H04B 7/024; H04B 7/026; H04B 7/0639
See application file for complete search history.

(56) References Cited

U.S. PATENT DOCUMENTS

2009/0303909 A1*  12/2009  Farhoudi et al. .............. 370/312
2010/0106828 A1    4/2010   Palanki et al.
(Continued)

FOREIGN PATENT DOCUMENTS

| JP | 2011077964 | 4/2011 |
|---|---|---|
| JP | 2011-109668 | 6/2011 |

(Continued)

OTHER PUBLICATIONS

Mitsubishi Electric, "Enhanced macro/femto and femto/femto ICIC solutions for data channels," 3GPP TSG RAN WG1 #61bis meeting, R1-103625, Jun. 2010, 4 pages.

(Continued)

*Primary Examiner* — Anh Ngoc Nguyen
(74) *Attorney, Agent, or Firm* — Lee, Hong, Degerman, Kang & Waimey

(57) ABSTRACT

The present invention relates to a wireless communication system, and more specifically to a method and an apparatus for inter-cell interference coordination for a transmission point group. The method for carrying out an interference coordination in a wireless communication system according to one embodiment of the present invention comprises a step for exchanging interference coordination messages between transmission point groups, wherein one transmission group comprises a plurality of transmission points, and the interference coordination message can comprises interference coordination information about each individual transmission point unit within the one transmission point group, and interference coordination information about the overall transmission point unit within the one transmission point group.

8 Claims, 10 Drawing Sheets

(51) Int. Cl.
  *H04J 11/00*  (2006.01)
  *H04B 7/02*  (2006.01)
  *H04B 7/06*  (2006.01)
  *H04W 52/34*  (2009.01)
  *H04W 72/12*  (2009.01)
  *H04W 72/04*  (2009.01)
  *H04W 88/08*  (2009.01)
  *H04B 7/04*  (2006.01)
  *H04W 52/24*  (2009.01)

(52) U.S. Cl.
  CPC ......... *H04J 11/0053* (2013.01); *H04J 11/0056* (2013.01); *H04W 52/346* (2013.01); *H04W 72/1278* (2013.01); *H04B 7/0452* (2013.01); *H04J 2211/001* (2013.01); *H04L 5/0035* (2013.01); *H04W 52/244* (2013.01); *H04W 72/0426* (2013.01); *H04W 88/085* (2013.01)

(56) References Cited

U.S. PATENT DOCUMENTS

2011/0124365 A1* 5/2011 Gresset et al. ................ 455/522
2011/0230200 A1* 9/2011 Dimou et al. .............. 455/452.2
2012/0014333 A1* 1/2012 Ji et al. ......................... 370/329

FOREIGN PATENT DOCUMENTS

| | | |
|---|---|---|
| KR | 1020100068162 | 6/2010 |
| KR | 1020110044132 | 4/2011 |
| KR | 10-2011-0081869 | 7/2011 |
| WO | 2009065075 | 5/2009 |

OTHER PUBLICATIONS

Huawei, et al., "Further Details of Scenarios," 3GPP TSG RAN WG1 meeting #64, R1-110629, Feb. 2011, 4 pages.
European Patent Office Application Serial No. 12823664.3, Search Report dated Mar. 5, 2015, 6 pages.
PCT International Application No. PCT/KR2012/006499, Written Opinion of the International Searching Authority dated Feb. 27, 2013, 17 pages.
Korean Intellectual Property Office Application Serial No. 10-2014-7003520, Notice of Allowance dated Oct. 30, 2015, 2 pages.
Nokia Siemens Networks, et al., "HeNB power control," 3GPP TSG RAN WG1 #61 Meeting, R1-102977, May 2010, 7 pages.

\* cited by examiner

FIG. 6
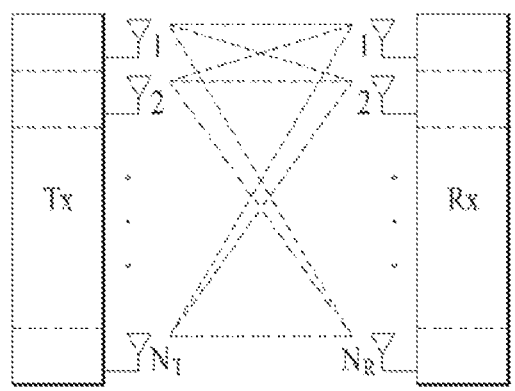
(a)
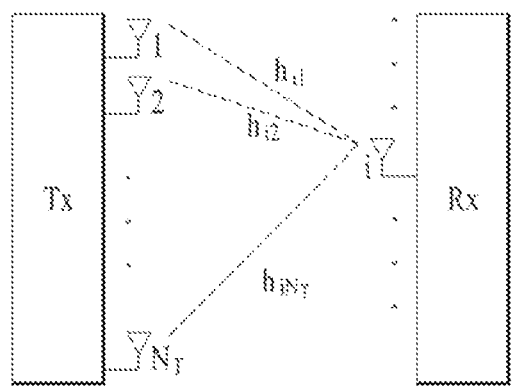
(b)

FIG. 7
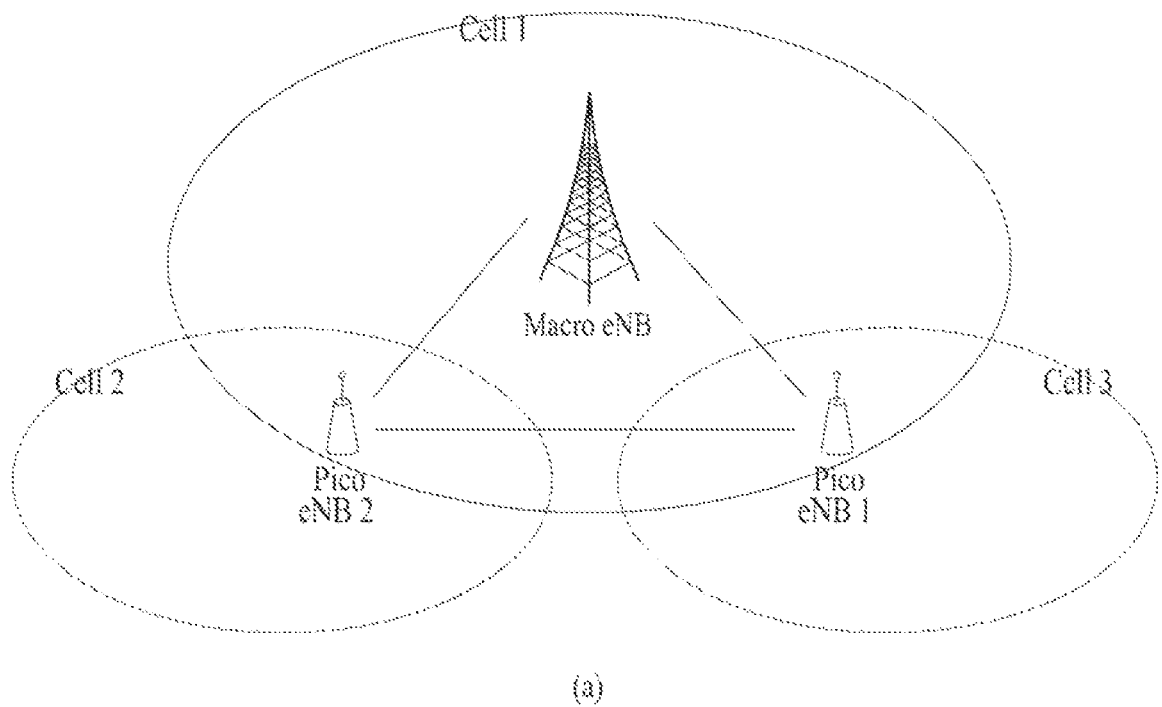
(a)
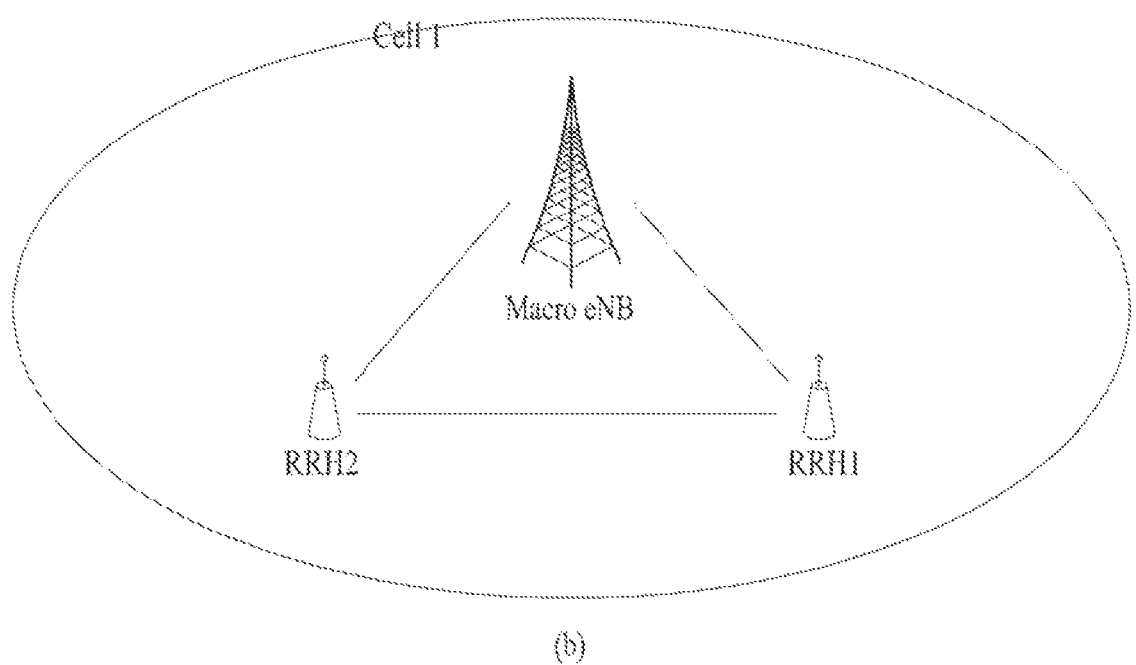
(b)

METHOD AND APPARATUS FOR INTER-CELL INTERFERENCE COORDINATION FOR TRANSMISSION POINT GROUP

CROSS-REFERENCE TO RELATED APPLICATIONS

This application is the National Stage filing under 35 U.S.C. 371 of International Application No. PCT/KR2012/006499, filed on Aug. 16, 2012, which claims the benefit of U.S. Provisional Application Ser. No. 61/524,743, filed on Aug. 17, 2011, the contents of which are hereby incorporated by reference herein in their entirety.

TECHNICAL FIELD

The following description relates to a wireless communication system, and more particularly, to a method of performing inter-cell interference coordination for a transmission point group and an apparatus therefor.

BACKGROUND ART

FIG. 1 is a diagram of a heterogeneous network wireless communication system 100 including a macro base station and a micro base station. In this specification, a terminology of a heterogeneous network means a network in which the macro base station 110 and the micro base stations 121/122 co-exist although an identical Radio Access Technology (RAT) is used.

The macro base station 121 means a general base station of a wireless communication system having a wide coverage and high transmit power. The macro base station 110 may also be named a macro cell.

For instance, the micro base station 121/122 can be named a micro cell, a pico cell, a femto cell, a home eNB (HeNB), a relay, or the like. The micro base station 121/122 is a small version of the macro base station 110 and can operate independently in a manner of performing most of functions of the macro base station. The micro base station is a sort of base stations installed (overlay) in an area covered by the macro base station or the base stations installable (non-overlay) in a radio shadow area where the macro base station is not able to cover. Compared to the macro base station 110, the micro base station 121/122 can accommodate small numbers of user equipments with a narrower coverage and lower transmit power.

A user equipment (hereinafter called a macro UE) 131 may be directly served from the macro base station 110 and a user equipment (hereinafter called a micro UE) 132 may be served from the micro base station 122 as well. In some cases, the user equipment 132 existing in the coverage of the micro base station 122 may be served from the macro base station 110.

If a user equipment served by a macro base station is adjacent to a micro base station, a downlink signal, which is received by a macro user equipment from the macro base station, may be interfered by interference occurred due to a strong downlink signal from the micro base station. Or, a user equipment served by the micro base station may be significantly interfered by interference occurred due to a downlink signal of the macro base station. as mentioned in the foregoing description, if one cell is significantly interfered by a neighboring cell, inter-cell interference coordination (ICIC) for mitigating/eliminating interference can be performed in a manner that the neighboring cell restricts transmission of the neighboring cell in a part of resource regions (e.g., a part of subframes and/or a part of frequency bands).

DISCLOSURE OF THE INVENTION

Technical Task

In an advanced wireless communication system, a communication scheme that a plurality of transmission points (TP) cooperates with each other can be introduced. For instance, a Coordinated Multi-Point (CoMP) technology may correspond to the communication scheme. In this case, a set of transmission points performing an operation of the CoMP may be represented as a CoMP cluster (or a coordinated communication cluster).

It is necessary to consider interference coordination between CoMP clusters and the interference coordination in terms of transmission points within the CoMP cluster together for ICIC in a wireless communication system of which the CoMP cluster is consisted. Since a legacy ICIC scheme is defined in terms of a single transmission point, it may be not appropriate for an interference coordination scheme associated with the CoMP cluster.

A technical task of the present invention is to provide a method of performing interference coordination in a wireless communication system of which a transmission point group (e.g., CoMP cluster) is consisted and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of performing interference coordination in a wireless communication system includes exchanging an interference coordination message between transmission point groups, wherein one transmission point group includes a plurality of transmission points and wherein the interference coordination message includes interference coordination information on a unit of an individual transmission point within the one transmission point group and the interference coordination information on a unit of all transmission points within the one transmission point group.

To further achieve these and other advantages and in accordance with the purpose of the present invention, according to a different embodiment, a device performing interference coordination in a wireless communication system includes a transmission module configured to transmit an interference coordination message to a different transmission point group, a reception module configured to receive the interference coordination message from the different transmission point group, and a processor configured to control an exchange of the interference coordination message between transmission point groups via the transmission module and the reception module, wherein one transmission point group includes a plurality of transmission points and wherein the interference coordination message includes interference coordination information on a unit of an individual transmission point within the one transmission point group and the interference coordination information on a unit of all transmission points within the one transmission point group.

In the embodiments according to the present invention, following description can be commonly applied.

The interference coordination message may further include identification information on the individual transmission point.

The identification information may include at least one selected from the group consisting of an identifier of the transmission point, an antenna port index of a reference signal, and a configuration index of a channel state information-reference signal.

The transmission points within the one transmission point group may include an identical cell identifier.

The interference coordination message may include information on a total amount of transmit power of a plurality of the transmission points within the one transmission point group.

The total amount of transmit power can be determined based on a weighted value for a plurality of the transmission points.

The weighted value can be determined based on a distance between each of a plurality of the transmission points within the one transmission point group and a different transmission point group.

Allocation of the transmit power allocated to a plurality of the transmission points can be controlled while the total amount of transmit power is maintained in the one transmission point group.

A cooperative communication performed by a plurality of the transmission points within the one transmission point group can be performed in case that a transfer rate achieved by the cooperative communication is greater than an amount of interference caused by the cooperative communication.

The interference coordination message may include at least one selected from the group consisting of ABS (almost blank subframe) configuration information, ABS status information, RNTP (relative narrowband transmission power) information, IOI (interference overhead indication) information, and HIT (high interference indication) information.

It is to be understood that both the foregoing general description and the following detailed description are exemplary and explanatory and are intended to provide further explanation of the invention as claimed.

Advantageous Effects

According to the present invention, it may provide a method of performing interference coordination in a wireless communication system of which a transmission point group is consisted and an apparatus therefor.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 6 is a diagram for a wireless communication system including multiple antennas;

FIG. 7 is a diagram for examples of configuring a CoMP cluster;

BEST MODE

Mode for Invention

Figure 1:
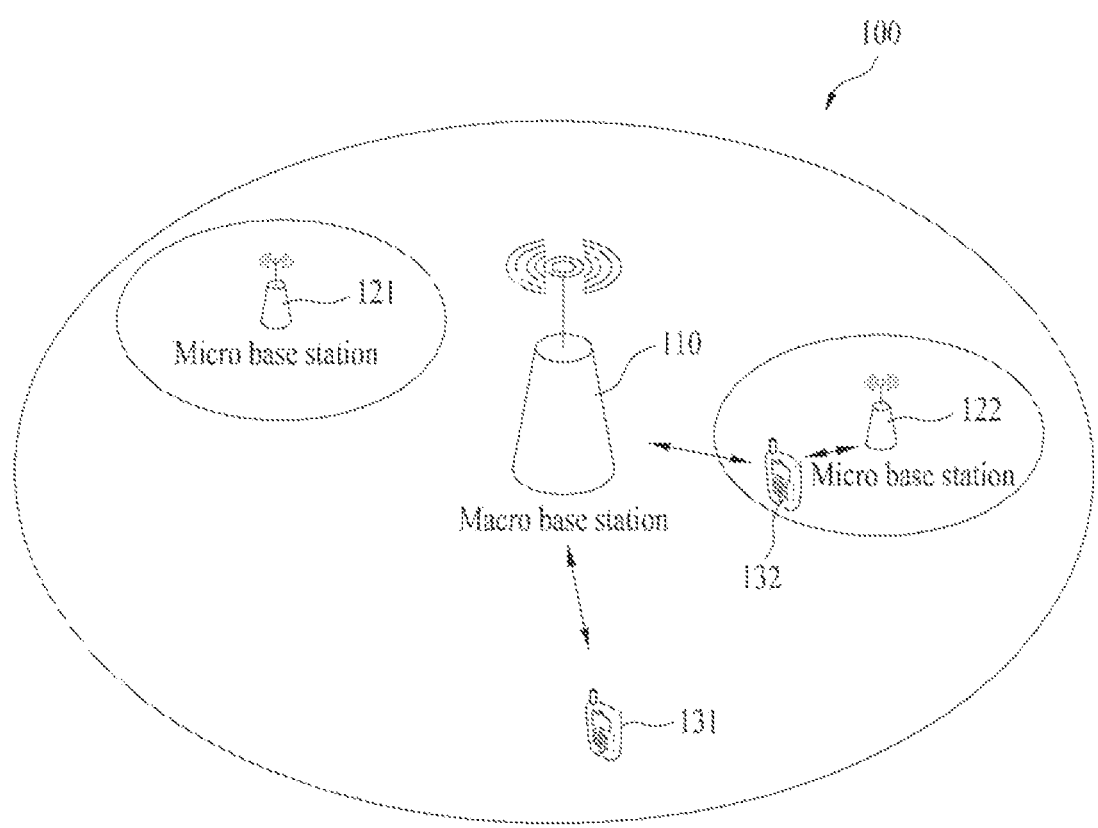
FIG. 1 is a diagram for a heterogeneous network wireless communication system 100 including a macro base station and a micro base station.

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

In this specification, embodiments of the present invention are described centering on the data transmission/reception relations between a base station and a user equipment. In this case, a base station has a meaning of a terminal node of a network directly communicating with a user equipment. In this disclosure, a specific operation explained as performed by a base station may be performed by an upper node of the base station in some cases.

In particular, in a network constructed with a plurality of network nodes including a base station, it is apparent that various operations performed for communication with a user equipment can be performed by a base station or other network nodes except the base station. 'Base station (BS)' may be substituted with such a terminology as a fixed station, a Node B, an eNode B (eNB), an access point (AP) and the like. A relay may be substituted with such a terminology as a relay node (RN), a relay station (RS), and the like. And, 'terminal' may be substituted with such a terminology as a user equipment (UE), an MS (mobile station), an MSS (mobile subscriber station), an SS (subscriber station), or the like.

Specific terminologies used in the following description are provided to help understand the present invention and the use of the specific terminologies can be modified into a different form in a range of not deviating from the technical idea of the present invention.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP ($3^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE and LTE-A standards, by which the technical idea of the present invention may be non-limited.

A structure of a downlink radio frame is explained with reference to FIG. 2.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

Figure 2:
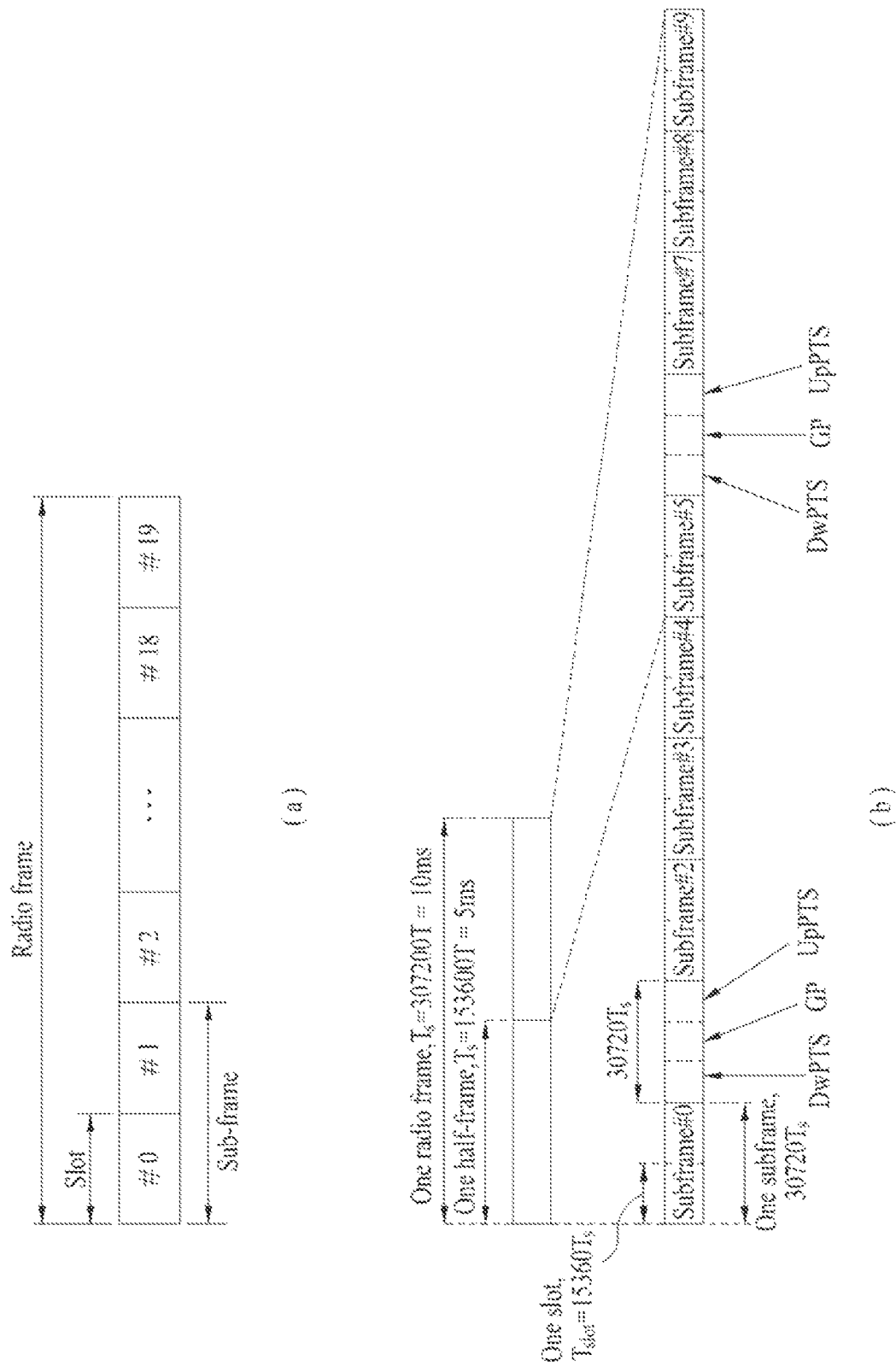
FIG. 2 is a diagram for a structure of a downlink radio frame.

FIG. 2 (a) is a diagram for a structure of a type 1 radio frame. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP (cyclic prefix). The CP may be categorized into an extended CP and a normal CP. For instance, in case that OFDM symbols are configured by the normal CP, the number of OFDM symbols included in one slot may correspond to 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may correspond to 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 1 (b) is a diagram for a structure of a downlink radio frame of type 2. A type 2 radio frame includes 2 half frames. Each of the half frame includes 5 subframes, a DwPTS (downlink pilot time slot), a GP (guard period), and an UpPTS (uplink pilot time slot). Each of the subframes includes 2 slots. The DwPTS is used for initial cell search, synchronization, or a channel estimation in a user equipment. The UpPTS is used for channel estimation of a base station and matching a transmission synchronization of a user equipment. The guard period is a period for eliminating interference generated in uplink due to multi-path delay of a downlink signal between uplink and downlink. Meanwhile, one subframe includes 2 slots irrespective of a type of a radio frame.

The above-described structures of the radio frame are exemplary only. And, the number of subframes included in a radio frame, the number of slots included in the subframe and the number of symbols included in the slot may be modified in various ways.

Figure 3:
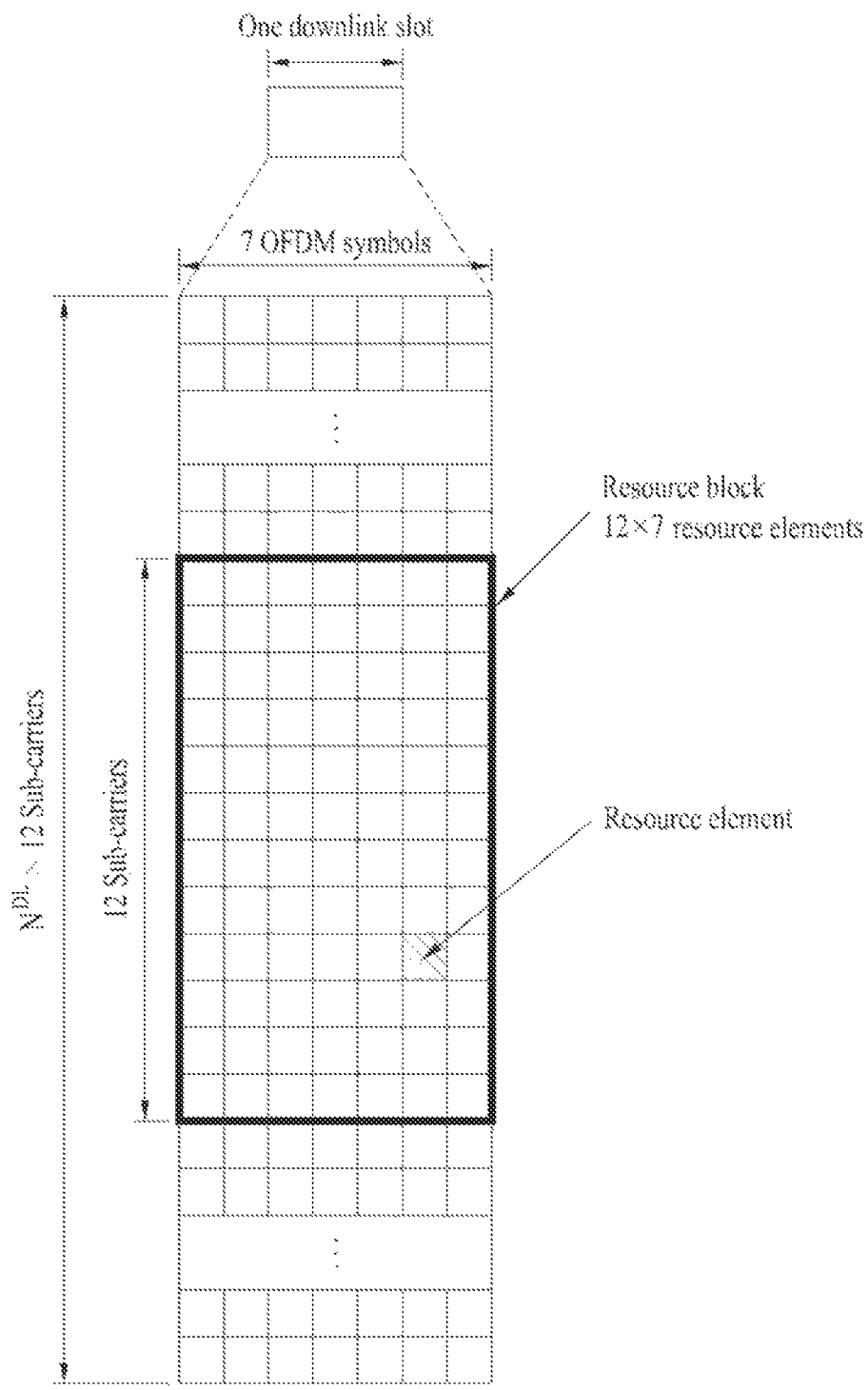
FIG. 3 is a diagram for a resource grid in a downlink slot.

FIG. 3 is a diagram for a resource grid in a downlink slot. Referring to FIG. 3, one downlink (DL) slot includes 7 OFDM symbols in time domain and one resource block (RB) includes 12 subcarriers in frequency domain, by which the present invention may be non-limited. For instance, in case of a normal CP (Cyclic Prefix), one slot includes 7 OFDM symbols. In case of an extended CP, one slot may include 6 OFDM symbols. Each element on a resource grid is called a resource element. One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 4:
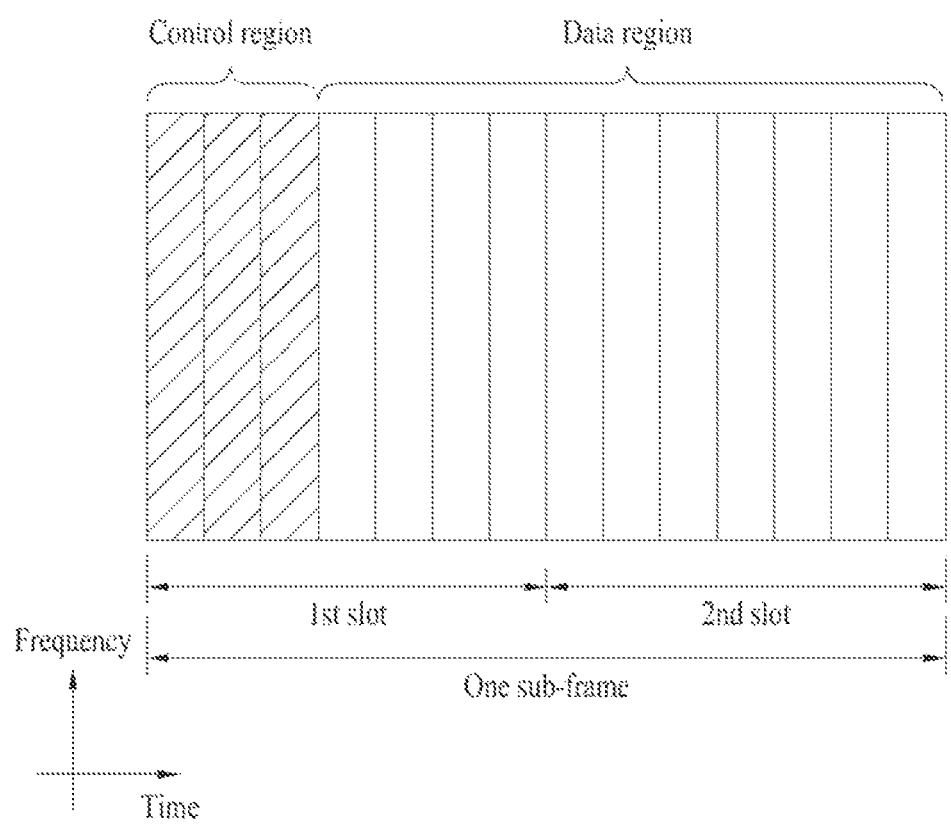
FIG. 4 is a diagram for a structure of a downlink subframe.

FIG. 4 is a diagram for a structure of a downlink (DL) subframe. Maximum 3 OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH is a response channel in response to UL transmission and includes an ACK/NACK signal. Control information carried on PDCCH may be called downlink control information (hereinafter abbreviated DCI). The DCI may include UL scheduling information, DL scheduling information or a UL transmit (Tx) power control command for a random UE (user equipment) group. PDCCH is able to carry resource allocation and transmission format (or called a DL grant) of DL-SCH (downlink shared channel), resource allocation information (or called a UL grant) of UL-SCH (uplink shared channel), paging information on PCH (paging channel), system information on DL-SCH, resource allocation to an upper layer control message such as a random access response transmitted on PDSCH, a set of transmission power control commands for individual user equipments within a random user equipment (UE) group, activation of VoIP (voice over IP) and the like. A plurality of PDCCHs can be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs. A base station determines PDCCH format in accordance with DCI to transmit to a user equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). In order to indicate a random access response that is a response to a transmission of a random access preamble of a user equipment, CRC can be masked with RA-RNTI (random access-RNTI).

Figure 5:
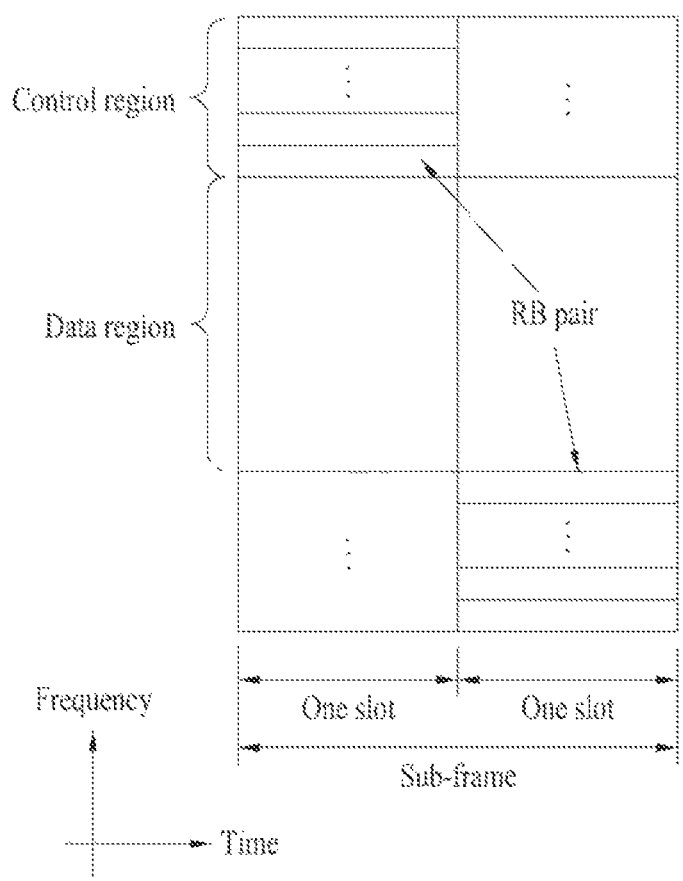
FIG. 5 is a diagram for a structure of an uplink subframe.

FIG. 5 is a diagram for a structure of an uplink (UL) subframe. Referring to FIG. 5, a UL subframe may be divided into a control region and a data region in frequency domain. A physical UL control channel (PUCCH), which includes UL control information, is assigned to the control region. And, a physical UL shared channel (PUSCH), which includes user data, is assigned to the data region. In order to maintain single carrier property, one user equipment does not transmit PUCCH and PUSCH simultaneously. PUCCH for one user equipment is assigned to a resource block pair (RB pair) in a subframe. Resource blocks belonging to the resource block (RB) pair may occupy different subcarriers in each of 2 slots. Namely, a resource block pair allocated to PUCCH is frequency-hopped on a slot boundary.

MIMO (Multi-Input Multi-Output) System Modeling

FIG. 6 is a diagram for a wireless communication system including multiple antennas.

As depicted in FIG. 6 (a), if the number of transmitting antennas and the number of receiving antennas are increased to $N_T$ and $N_R$, respectively, unlike a case that either a transmitter or a receiver uses a plurality of antennas, a theoretical channel transmission capacity is increased in proportion to the number of antennas. By doing so, a transfer rate is enhanced and frequency efficiency can be considerably enhanced. As the channel transmission capacity increases, the transfer rate can be theoretically increased as much as the maximum transfer rate ($R_o$) in case of using a single antenna multiplied by a rate of increase ($R_i$).

$$R_i = \min(N_T, N_R) \quad \text{[Formula 1]}$$

For instance, in case of a MIMO communication system using 4 transmitting antennas and 4 receiving antennas, the system may be able to obtain the transfer rate of theoretically 4 times of a single antenna system. After the theoretical capacity increase of the MIMO system is proved in the mid-90s, various technologies to draw a practical data transfer rate from the MIMO system have been actively studied until now. Moreover, some of the technologies are already reflected in such various wireless communication standards as a $3^{rd}$ generation mobile communication, a next generation wireless LAN, and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

A communication method in the multi-antenna system is explained in more detail using a mathematical modeling. Assume that there exist $N_T$ number of transmitting antenna and $N_R$ number of receiving antenna in the system.

First of all, if we look into a transmission signal, in case that there exists $N_T$ number of transmitting antenna, transmission information capable of being transmitted can be represented as follows.

$$s = [s_1, s_2, \ldots, s_{N_T}]^T \quad \text{[Formula 2]}$$

Meanwhile, for each of the transmission informations $s_1, s_2, \ldots, s_{N_T}$, a transmit power may vary according to the each of the transmission informations. In this case, if each of the transmit powers is represented as $P_1, P_2, \ldots, P_{N_T}$, transmit power-adjusted transmission information can be represented as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Formula 3]}$$

And, if $\hat{s}$ is represented using a diagonal matrix P, it can be represented as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

Meanwhile, let's consider a case that the $N_T$ number of transmission signal $x_1, x_2, \ldots, x_{N_T}$, which is practically transmitted, is configured in a manner of applying a weighted matrix W to the transmit power-adjusted information vector $\hat{s}$. In this case, the weighted matrix W plays a role in distributing the transmission information to each of the antennas according to the situation of the transmission channel and the like. The transmission signal $x_1, x_2, \ldots, x_{N_T}$ can be represented using a vector X in the following.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Formula 5]}$$

$$W\hat{s} = WPs$$

In this case, $W_{ij}$ means a weighting between an $i^{th}$ transmitting antenna and $j^{th}$ information. The W is called a precoding matrix as well.

If there exists $N_R$ number of receiving antenna, a reception signal for each antenna $y_1, y_2, \ldots, y_{N_R}$ represented as a vector in the following.

$$y = [y_1, y_2, \ldots, y_{N_R}]^T \quad \text{[Formula 6]}$$

In case of modeling a channel in a multi-antenna wireless communication system, the channel can be distinguished by a transmitting and receiving antenna index. The channel passing through a transmitting antenna j to receiving antenna i is represented as $h_{ij}$. According to the $h_{ij}$, it should be cautious that a receiving antenna index comes first and a transmitting antenna index comes later.

Meanwhile, FIG. 6 (b) is a diagram of channels passing through from $N_T$ number of transmitting antennas to the receiving antenna i. The channels can be represented as a vector and a matrix form in a manner of being collected. According to FIG. 6 (b), a channel starting from the total $N_T$ number of transmitting antennas and arriving at the receiving antenna i can be represented as follows.

$$h_i^T = [h_{i1}, h_{i2}, \ldots, h_{iN_T}] \quad \text{[Formula 7]}$$

Hence, all channels starting from the $N_T$ number of transmitting antennas and arriving at the $N_R$ number of receiving antennas can be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Formula 8]}$$

Practically, after passing through the channel matrix H, an Additive White Gaussian Noise (AWGN) is added to the channel. The Additive White Gaussian Noise (AWGN) $n_1, n_2, \ldots, n_{N_R}$ added to the each of the $N_R$ number of receiving antennas can be represented as follows.

$$n = [n_1, n_2, \ldots, n_{N_R}]^T \quad \text{[Formula 9]}$$

According to the aforementioned mathematical modeling, a reception signal can be represented as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Formula 10]}$$

$$Hx + n$$

Meanwhile, numbers of column and row of the channel matrix H, which indicates a state of a channel, are determined by the number of transmitting/receiving antenna. In the channel matrix H, the number of row corresponds to the number of receiving antennas $N_R$ and the number of column corresponds to the number of transmitting antennas $N_T$. In particular, the channel matrix H corresponds to a matrix of $N_R \times N_T$.

Since a rank of the channel matrix is defined by minimum number of the row or column independent from each other, the rank of the matrix is configured not to be greater than the number of the row or the column. The rank rank(H) of the channel matrix H is restricted as follows.

$$\text{rank}(H) \leq \min(N_T, N_R) \quad \text{[Formula 11]}$$

According to a different definition for a rank, the rank can be defined by the number of Eigen values, which is not 0, when a matrix is processed by Eigen value decomposition. Similarly, according to a further different definition for a rank, the rank can be defined by the number of singular values, which is not 0, when a matrix is processed by singular value decomposition. Hence, physical meaning of the rank in the channel matrix may correspond to a maximum number capable of transmitting information different from each other in a given channel.

Coordinated Multi-Point (CoMP)

According to an improved system performance requirement of a 3GPP LTE-A system, a CoMP transmission/reception technology MIMO (also represented as a co-MIMO, a collaborative MIMO, a network MIMO, or the like) is proposed. The CoMP technology increases the performance of a user equipment situating at a cell edge and can increase an average sector throughput.

In general, in a multi-cell environment where a frequency reuse factor corresponds to 1, the performance of a user equipment situating at a cell boundary and the average sector throughput can be reduced due to inter-cell interference (ICI). In order to reduce the ICI, a legacy LTE system applied a method for enabling the user equipment situating at a cell boundary to have an appropriate throughput performance using such a simple passive scheme as a fractional frequency reuse (FFR) via a UE-specific power control in an environment limited by the interference. Yet, it may be more preferable to reduce the ICI or reuse the ICI as a signal that the user equipment wants than to lower the use of a frequency resource per cell. In order to achieve the aforementioned purpose, CoMP transmission scheme can be applied.

The CoMP scheme applicable in DL can be largely classified into a joint processing (JP) scheme and a coordinated scheduling/beamforming (CS/CB) scheme.

The JP scheme can use a data in each point (base station) of a CoMP cooperative unit. The CoMP cooperative unit means a set of base stations used for a cooperative transmission scheme. The JP scheme can be classified into a joint transmission scheme and a dynamic cell selection scheme.

The joint transmission scheme indicates a scheme transmitting PDSCH from a plurality of points (a part or entire CoMP cooperative units) at a time. In particular, the data transmitted to single user equipment can be simultaneously transmitted from a plurality of transmission points. According to the joint transmission scheme, quality of a reception signal can be coherently or non-coherently enhanced. And, interference for a different user equipment can be actively eliminated.

The dynamic cell selection scheme indicates a scheme transmitting PDSCH from a point (of a CoMP cooperative unit) at a time. In particular, a data transmitted to single user equipment on a specific timing point is transmitted from one point. A different point within the cooperative unit does not transmit a data to the corresponding user equipment on the specific timing point. The point transmitting the data to the corresponding user equipment can be dynamically selected.

Meanwhile, according to CS/CB scheme, the CoMP cooperative units can cooperatively perform a beamforming of data transmission for single user equipment. In this case, although the data is transmitted from a serving cell only, a user scheduling/beamforming can be determined by a coordination of cells in a corresponding CoMP cooperative unit.

Meanwhile, in case of UL, a coordinated multi-point reception means to receive a signal transmitted by coordination of a plurality of points, which are geographically apart from each other. The CoMP scheme applicable in case of UL can be classified into a joint reception (JR) and the coordinated scheduling/beamforming (CS/CB).

The JR scheme means that a signal transmitted on PUSCH is received by a plurality of receiving points. The CS/CB scheme means that PUSCH is received at one point and a user scheduling/beamforming is determined by coordination of cells in a CoMP cooperative unit.

If the aforementioned CoMP system is used, a user equipment can be jointly supported with a data from a multi-cell base station. And, by simultaneously supporting at least one user equipment using a same radio frequency resource, each base station can enhance system performance. And, the base station may perform a space division multiple access (SDMA) scheme based on channel state information between the base station and the user equipment.

In a CoMP system, a serving base station and one or more cooperative base stations are connected to a scheduler via a backbone network. The scheduler can operate in a manner of being fed back channel information on a channel state between a user equipment and a cooperative base station, which is measured by the each base station via the backbone network. For instance, the scheduler can schedule information for the serving base station and one or more cooperative base stations to perform a cooperative MIMO operation. In particular, the scheduler can directly give a direction for the cooperative MIMO operation to each base station.

As mentioned in the foregoing description, the CoMP system may correspond to a virtual MIMO system operating in a manner of bundling up a plurality of cells into a group. Basically, a communication technique of a MIMO system using multi-antenna can be applied to the CoMP system.

Downlink Channel State Information (CSI) Feedback

A MIMO scheme can be divided into an open-loop scheme and a closed-loop scheme. The open-loop MIMO scheme means to perform MIMO transmission in a transmitting end without a feedback of channel state information from a MIMO receiving end. The closed-loop MIMO scheme means to perform the MIMO transmission in the transmitting end by receiving the feedback of the channel state information from the MIMO receiving end. Each of the transmitting end and the receiving end can perform beamforming based on the channel state information to obtain multiplexing gain of the MIMO transmission antenna in the closed-loop MIMO scheme. The transmitting end (e.g., base station) can assign a UL control channel or a UL shared channel to the receiving end (e.g., UE) in order for the receiving end (e.g., UE) to feedback the channel state information.

The channel state information (CSI) to be fed back may include a rank indicator (RI), a precoding matrix index (PMI), and a channel quality indicator (CQI).

The RI corresponds to information on a channel rank. The channel rank means maximum numbers of layer (or stream) capable of transmitting information different from each other via an identical time-frequency resource. Since a rank value is mainly determined by a long term fading of a channel, the rank value can be fed back with a longer interval (i.e., less frequently) compared to the PMI and the CQI in general.

The PMI corresponds to information on a precoding matrix used for transmitting from the transmitting end. The PMI is a value reflecting characteristics of space of a channel. A precoding means to map a transmission layer to a transmission antenna and a layer-antenna mapping relationship can be determined by a precoding matrix. The PMI corresponds to a precoding matrix index of a base station preferred by a user equipment on the basis of such a measurement value (metric) as signal-to-interference plus noise ratio (SINR) and the like. In order to reduce feedback overhead of precoding information, a method of sharing a codebook shared by the transmitting end and the receiving end including various precoding matrices in advance and performing a feedback of an index for indicating a specific precoding matrix of the corresponding codebook only can be used.

The CQI corresponds to information indicating channel quality or channel strength. The CQI can be represented by a combination of a predetermined modulation and coding scheme (MCS). In particular, a CQI index to be fed back may indicate a corresponding modulation scheme and a code rate. In general, the CQI may become a value reflecting a reception SINR, which is obtainable in case that a base station forms a spatial channel using the PMI.

A system supporting an extended antenna configuration (e.g., LTE-A system) considers obtaining additional multi-user diversity by using a multiple user-MIMO (MU-MIMO) scheme. Since interference channel exists between user equipments, which are multiplexed in an antenna domain, in the MU-MIMO scheme, if a base station performs a DL transmission using the channel state information fed back by one user equipment of the multiple users, it is necessary to make interference for a different user equipment not occur. Hence, in order to properly perform an MU-MIMO operation, channel state information having higher accuracy compared to a single user-MIMO (SU-MIMO) scheme should be fed back.

As mentioned in the foregoing description, in order to measure and report more accurate channel state information, a new CSI feedback method, which is upgraded from the CSI consisted of a conventional RI, the PMI, and the CQI, can be applied. For instance, the precoding information fed back by the receiving end can be indicated by a combination of 2 PMIs. One (first PMI) of the 2 PMIs including a property of long term and/or wideband can be called a W1. Another one (second PMI) of the 2 PMIs including a property of short term and/or subband can be called a W2. A final PMI can be determined by a combination (or function) of the W1 and the W2. For instance, if the final PMI corresponds to W, it can be defined as 'W=W1*W2' or 'W=W2*W1'.

In this case, the W1 reflects a frequency of a channel and/or an average characteristic on time. In other word, the W1 can be defined as the channel state information reflecting a characteristic of a long term channel in time, a characteristic of a wideband channel on frequency, or both the characteristic of a long term channel in time and the characteristic of a wideband channel on frequency. In order to briefly represent the characteristic of the W1, the present specification assumes the W1 as the channel state information of long term-wideband property (or, long term-wideband PMI).

Meanwhile, the W2 reflects relatively instantaneous channel characteristic compared to the W1. In other word, the W2 can be defined as the channel state information reflecting a characteristic of a short term channel in time, a characteristic of a subband channel on frequency, or both the characteristic of a short term channel in time and the characteristic of a subband channel on frequency. In order to briefly represent the characteristic of the W2, the present specification assumes the W2 as the channel state information of short term-subband property (or, short term-subband PMI).

In order to determine one final precoding matrix (W) from the informations (e.g., the W1 and the W2) of 2 properties different from each other indicating channel state, it is necessary to configure a separate codebook (in particular, a first codebook for the W1 and a second codebook for the W2) consisted of precoding matrices indicating the channel information of each property. A form of the codebook configured according to the aforementioned way can be called a hierarchical codebook. And, to determine a codebook to be finally used using the hierarchical codebook can be called a hierarchical codebook transformation.

As an example of the hierarchical transformation, a codebook can be transformed using a long term covariance matrix of a channel as shown in the following Formula 12.

$$W = \text{norm}(W1\,W2) \quad [\text{Formula 12}]$$

In Formula 12, the W1 (long term-wideband PMI) indicates an element (i.e., codeword) for constructing a codebook (e.g., first codebook) designed to reflect the channel information of a long term-wideband property. In particular, the W1 corresponds to a precoding matrix included in the first codebook reflecting the channel information of the long term-wideband. Meanwhile, the W2 (short term-subband PMI) indicates a codeword constructing a codebook (e.g., second codebook) designed to reflect the channel information of a short term-subband property. In particular, the W2 corresponds to a precoding matrix included in the second codebook reflecting the channel information of the short term-subband. W indicates a codeword of a final transformed codebook. norm (A) means a matrix that a norm according to each column of a matrix A is normalized to 1.

For instance, the W1 and the W2 may have a structure shown in the following Formula 13.

$$W1(i) = \begin{bmatrix} X_i & 0 \\ 0 & X_i \end{bmatrix} \quad [\text{Formula 13}]$$

$$W2(j) = \overbrace{\begin{bmatrix} e_M^k & e_M^l & \cdots & e_M^m \\ \alpha_j e_M^k & \beta_j e_M^l & & \gamma_j e_M^m \end{bmatrix}}^{r\ columns} \ (\text{if rank} = r)$$

In Formula 13, the W1 can be defined as a form of a block diagonal matrix and each block corresponds to an identical matrix ($X_i$). One block ($X_i$) can be defined as a matrix of ($N_t/2$)×M size. In this case, the $N_t$ corresponds to the number of transmitting antenna. In Formula 13, $e_M^p$ (p=k, l, ..., m) of the W2 is a vector of M×1 size. The vector indicates that $p^{th}$ component is 1 and the rest of components are 0 among the M number of vector components. In case of multiplying the $e_M^p$ by the W1, since the $p^{th}$ column is selected among the columns of the W1, this sort of vector is called a selection vector. In this case, as a value of M increases, the number of vectors fed back at a time increases to represent the long term/wideband channel. By doing this, feedback accuracy becomes higher. Yet, as the value of M increases, the codebook size of the W1, which is fed back with low frequency, is diminished and the codebook size of the W2, which is fed back with high frequency, is increased. As a result, feedback overhead increases. In particular, there exists a tradeoff between the feedback overhead and the feedback accuracy. Hence, the M value can be determined not to make the feedback overhead increase too much while maintaining appropriate feedback accuracy. Meanwhile, $\alpha_j$, $\beta_j$, $\gamma_j$ of the W2 indicate prescribed phase values, respectively. In Formula 13, '1≤k, l, m≤M' and each of k, l, m is an integer.

The codebook structure shown in Formula 13 is a structure designed to well reflect a correlation property of a channel, which occurs in case that a cross polarized (X-pol) antenna configuration is used and a space between antennas is dense (commonly, in case that a distance between neighboring antennas is less than a half of a signal wavelength). For instance, the cross-polarized antenna configuration can be represented as a Table 1 as follows.

TABLE 1

| | |
|---|---|
| 2Tx cross-polarized antenna configuration |  |
| 4Tx cross-polarized antenna configuration |  |
| 8Tx cross-polarized antenna configuration |  |

In Table 1, an 8Tx cross-polarized antenna configuration can be represented as the 8Tx cross-polarized antenna configuration is configured with 2 antenna groups having a property of orthogonal to each other. Antennas (antenna 1, 2, 3, and 4) of an antenna group 1 have an identical polarization (e.g., vertical polarization) and antennas (antenna 5, 6, 7, and 8) of an antenna group 2 may have an identical polarization (e.g., horizontal polarization). And, the two antenna groups are located at an identical location (co-located). For instance, antenna 1 and 5 can be installed in a same place, antenna 2 and 6 can be installed in a same place, antenna 3 and 7 can be installed in a same place, and antenna 4 and 8 can be installed in a same place. In other word, the antennas belonging to one antenna group have an identical polarization such as a uniform linear array (ULA) and correlation between antennas within one antenna group has a property of linear phase increment. And, correlation between antenna groups has a property of phase rotation.

Since a codebook corresponds to a quantized channel value, it is necessary to design the codebook in a manner of reflecting the characteristic of a practical channel as it is. In order to explain that the characteristic of practical channel is reflected to the codeword of the codebook designed like Formula 13, a rank 1 codebook is explained as an example. In the following description, Formula 14 in the following indicates an example that a final codeword (W) is determined in a manner of multiplying a W1 codeword by a W2 codeword in case of a rank 1.

$$W1(i) * W2(j) = \begin{bmatrix} X_i(k) \\ \alpha_j X_i(k) \end{bmatrix} \quad [\text{Formula 14}]$$

In Formula 14, the final codeword is represented by a vector of $N_{tx}1$ and is structured by two vectors corresponding to a upper vector $X_i(k)$ and a lower vector $\alpha_j X_i(k)$. The upper vector $X_i(k)$ indicates the correlation characteristic of a horizontal polarization antenna group of a cross polarization antenna and the lower vector $\alpha_j X_i(k)$ indicates the correlation characteristic of a vertical polarization antenna group. And, the $X_i(k)$ can be represented by a vector (e.g., DFT matrix) having linear phase increment by reflecting the correlation characteristic between antennas belonging to each of the groups.

In case of using the aforementioned codebook, it enables to perform a channel feedback of higher accuracy compared to a case of using a single codebook. Hence, a single-cell MU-MIMO may be enabled by using the channel feedback of higher accuracy. With a similar reason, CoMP operation requires a channel feedback of higher level of accuracy as well. For instance, In case of a CoMP JT operation, since a plurality of base stations cooperatively transmit an identical data to a specific UE, it can be theoretically considered as a MIMO system where a plurality of antennas are geographically distributed. In particular, similar to the single-cell MU-MIMO, in case of performing a MU-MIMO operation in the CoMP JT, high level of accuracy of channel information is required to avoid interference between co-scheduled UEs. And, in case of a CoMP CB operation, elaborate channel information is required as well to avoid the interference affecting a serving cell by a neighboring cell.

Inter-Cell Interference Coordination (ICIC)

Interference between neighboring cells may cause a problem in the aforementioned heterogeneous network environment and/or the CoMP environment. In order to solve the problem of inter-cell interference, inter-cell interference coordination can be applied. A conventional ICIC can be applied to a frequency resource or a time resource.

As an example of the ICIC for the frequency resource, 3GPP LTE release-8 system divides a given whole frequency domain (e.g., system bandwidth) into one or more sub domains (e.g., physical resource block (PRB) unit) and defines a method of exchanging an ICIC message for each of the frequency sub domains between cells. For instance, as the information included in the ICIC message for the frequency resource, relative narrowband transmission power (RNTP) related to a DL transmit power is defined and UL interference overhead indication (MI) related to UL interference, UL high interference indication (HII), and the like are defined in the 3GPP LTE release-8 system.

The RNTP is the information indicating DL transmit power used by a cell transmitting an ICIC message on a specific frequency sub domain. For instance, if an RNTP field for the specific frequency sub domain is set to a first value (e.g., 0), it may mean that the DL transmit power of a corresponding cell does not exceed a prescribed threshold on the corresponding frequency sub domain. Or, if the RNTP field for the specific frequency sub domain is set to a second value (e.g., 1), it may mean that the corresponding cell cannot promise the DL transmit power on the corresponding frequency sub domain. In other word, if the value of the RNTP field corresponds to 0, the DL transmit power of the corresponding cell can be considered to be low. Yet, if the value of the RNTP field corresponds to 1, the DL transmit power of the corresponding cell cannot be considered to be low.

The UL IOI is the information indicating an amount of UL interference experienced (or received) by a cell transmitting an ICIC message on the specific frequency sub domain. For instance, if an IOI field for the specific frequency sub domain is set to a value corresponding to a large amount of interference, it may mean that the corresponding cell is experiencing strong UL interference on the frequency sub domain. Having received the ICIC message, the cell can schedule a user equipment using low transmit power among the user equipments served by the cell on the frequency sub domain corresponding to the IOI indicating strong UL interference. By doing so, since the user equipments perform UL transmission with a low transmit power on the frequency sub domain corresponding to the IOI indicating the strong UL interference, the UL interference experienced by a neighboring cell (i.e., the cell transmitted the ICIC message) can be reduced.

The UL HII is the information indicating an extent of interference (or, UL interference sensitivity) capable of being occurred by a UL transmission for a corresponding frequency sub domain in a cell transmitting the ICIC message. For instance, if a HII field is set to a first value (e.g., 1) for a specific frequency sub domain, it may mean that the cell transmitting the ICIC message is likely to schedule a user equipment of a strong UL transmit power for the corresponding frequency sub domain. On the other hand, if the HII field is set to a second value (e.g., 0) for the specific frequency sub domain, it may mean that the cell transmitting the ICIC message is likely to schedule a user equipment of a weak UL transmit power for the corresponding frequency sub domain. Meanwhile, having received the ICIC message, the cell preferentially schedules a user equipment for the frequency sub domain where the HII field is set to the second value (e.g., 0) and schedules a user equipment capable of well operating despite of strong interference for the frequency sub domain where the FII field is set to the first value (e.g., 1), thereby avoiding the interference from the cell transmitted the ICIC message.

Meanwhile, as an example of an ICIC for the time resource, 3GPP LTE release-10 system divides a given whole time domain into one or more sub domains (e.g., subframe unit) and defines a method of exchanging whether a silencing is performed for each of the time sub domains between cells. The cell transmitting an ICIC message can deliver the information indicating that a silencing is performed in a specific subframe to neighbor cells and does not schedule PDSCH or PUSCH in the corresponding subframe. Meanwhile, a cell receiving the ICIC message can schedule UL and/or DL transmission for a user equipment in the subframe where the silencing is performed which is indicated by the cell in which the ICIC message is transmitted.

The silencing may mean that a specific cell does not perform (or performs transmission of 0 or weak power) an operation of most of signal transmission in UL and DL in a specific subframe. As an example of the silencing operation, the specific cell can configure the specific subframe as a multicast broadcast single frequency network (MBSFN) subframe. In a DL subframe configured as the MBSFN subframe, a signal is transmitted in a control region only and the signal is not transmitted in a data region. As a different example of the silencing operation, an interfering cell may configure the specific subframe as an almost blank subframe (ABS) or an ABS-with-MBSFN. The ABS means a subframe transmitting a CRS only in the control region and the data region of a DL subframe and the subframe where other control information and data are not transmitted (or, performs transmission of a weak power only). Yet, such a DL channel as PBCH, PSS, SSS, and the like and a DL signal can be transmitted in the ABS. The ABS-with-MBSFN indicates a case that the CRS of the data region is not transmitted in the aforementioned ABS. As mentioned in the foregoing description, the silencing can be performed in a specific subframe unit and the information indicating whether the silencing is performed can be called a silent subframe pattern.

And, a silent subframe explained in the embodiment of the present invention can be understood as a subframe to which no signal is transmitted or a subframe to which a signal of weak power is transmitted. For clarity of explanation, the silent subframe according to the aforementioned various schemes is commonly called an ABS in the following description.

Interference Coordination Between CoMP Clusters

A CoMP cluster means a set of transmission points cooperatively performing a CoMP operation. For clarity, a terminology of a CoMP cluster or a cluster is used in the following description. Yet, the principle of the present invention can be identically applied to the terminology as a method of performing interference coordination for 'a group of transmission points consisted of at least one transmission point'.

FIG. 7 is a diagram for examples of configuring a CoMP cluster. FIG. 7 (a) indicates an example that each of transmission points in one cluster forms a cell different from each other. In this case, the each transmission point may correspond to an eNB and may have a separate cell ID. Meanwhile, FIG. 7 (b) indicates an example that all transmission points in one cluster share an identical cell ID. In particular, the transmission points in FIG. 7 (b) configuring an exemplary cluster may correspond to distributed antennas in one cell and may be named a remote radio head (RRH).

In general, transmission points in an identical cluster are connected to each other with a link of high performance (e.g., supporting high capacity and low latency) to perform a close cooperation. On the contrary, clusters different from each other are connected to each other with a link of a lower performance. Hence, it is necessary to have a method of performing ICIC in consideration of link performance between CoMP clusters.

According to a legacy ICIC, the legacy ICIC is defined as the ICIC is performed in terms of a single transmission point. According to the definition, it is difficult to appropriately support the ICIC, which has considered the attribute of the CoMP cluster such as the aforementioned example shown in FIG. 7. Hence, the present invention proposes a method capable of appropriately supporting interference coordination between CoMP clusters in a manner of considering a cause and aspect of the interference between the CoMP clusters.

For clarity, an interfering side is called an aggressor cluster or an aggressor cell and an interfered side is called a victim cluster or a victim cell in the following description. And, an ICIC message transceived between clusters or cells may include information on interference coordination (e.g., transmit power configuration) in time domain and/or frequency domain. For instance, the information on the interference coordination in time domain may include information on ABS configuration transmitted by an aggressor side, information on ABS status transmitted by a victim side, and the like. The information on the ABS status transmitted by the victim side may correspond to information on what percent of ABS resource is used among ABS set by the aggressor side. Having received the information, the aggressor side may use the information to update ABS configuration of the aggressor side. For instance, the information on the interference coordination in frequency domain may include information on RNTP or HII of the aggressor side, information on IOI of the victim side, and the like.

In defining an interference coordination message between CoMP clusters, the present invention proposes a method of coexisting ICIC of a CoMP cluster unit and ICIC of a transmission point unit that forms a CoMP cluster. By doing so, it may be able to support efficient and precise ICIC in a wireless communication system of which a transmission point group (e.g., CoMP cluster) is consisted.

Embodiment 1

In transceiving an inter-cluster interference coordination message, the present embodiment corresponds to a method of indicating that the ICIC message is related to a specific transmission point (TP). And, in order to perform the ICIC for a different transmission point within a cluster, a separate inter-cluster interference coordination message (i.e., the ICIC message for the different transmission point) can be used.

According to the present embodiment, ICIC information on an individual transmission point included in one cluster can be represented using the inter-cluster interference coordination message. Basically, the inter-cluster interference coordination message can include ICIC information of a cluster unit (or cluster-specific). Yet, since the inter-cluster interference coordination message is not appropriate for representing the ICIC information on the individual transmission point included in a cluster, the present embodiment proposes a method of exchanging the ICIC information on the individual transmission point while using the inter-cluster interference coordination message. For instance, transmission point-specific (TP-specific) ICIC information can be exchanged using the inter-cluster interference coordination message in a case that a plurality of transmission points have an identical cell ID in one cluster as depicted in the example of FIG. 7 (b) as well as a case that a plurality of the transmission points form an individual cell in one cluster as depicted in the example of FIG. 7 (a).

Figure 8:
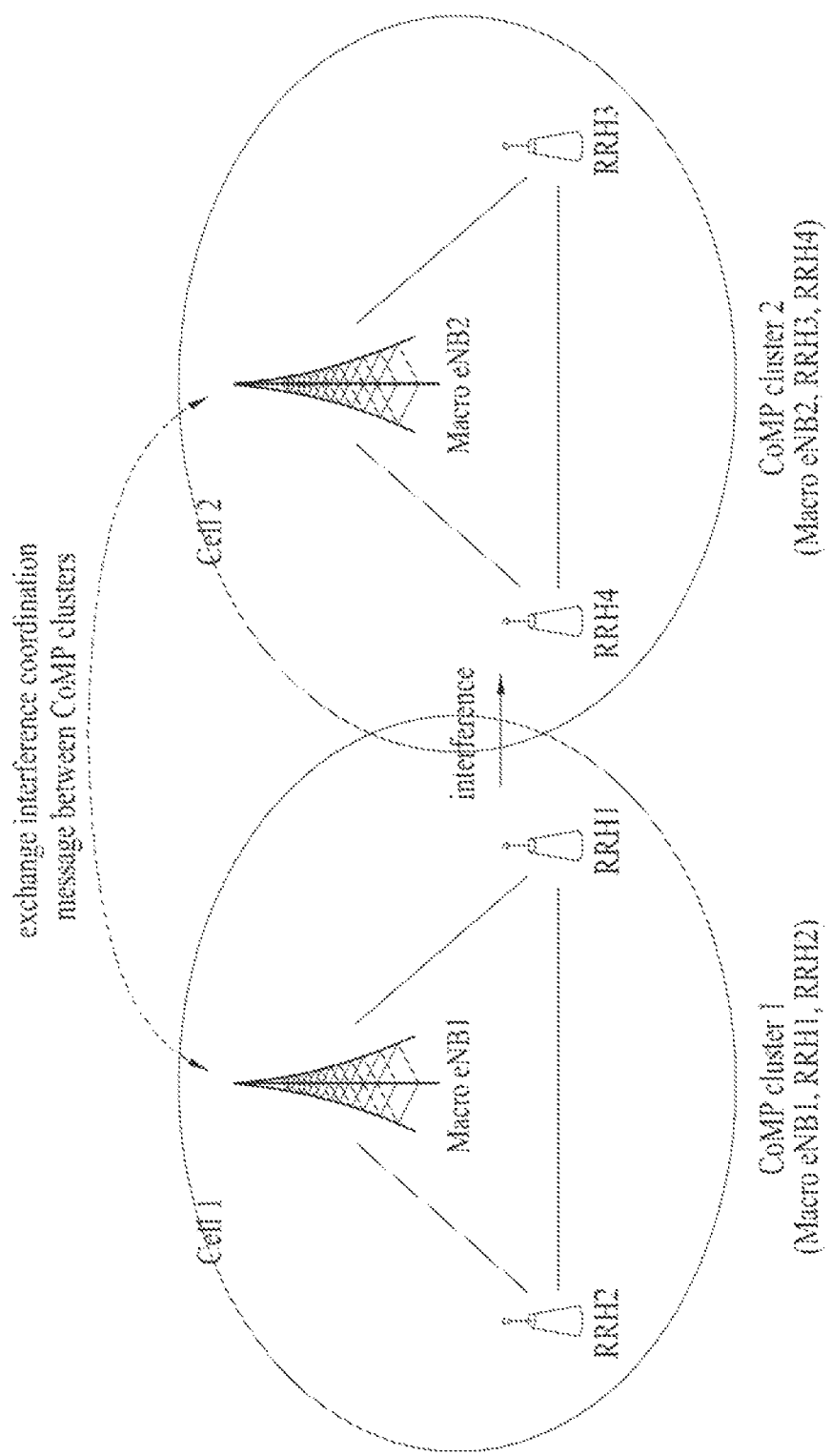
FIG. 8 is a diagram for one example of performing interference coordination between CoMP clusters.

FIG. 8 is a diagram for one example of performing interference coordination between CoMP clusters. According to an example of FIG. 8, assume that a transmission point belonging to a CoMP cluster 1 causes interference and a CoMP cluster 2 is interfered by the interference. Specifically, assume a case that a first RRH (RRH 1) of a first cell (cell 1) causes interference for a second cell (cell 2) only. In this case, when the cell 1 transmits an ICIC message to the cell 2, the cell 1 may be able to inform the cell 2 that the ICIC message is related to the RRH 1.

Information for indicating a transmission point may correspond to information (i.e., transmission point identification information) used for separating one transmission point from another transmission point. For instance, the information may correspond to an identifier (i.e., a separate identifier different from a cell ID) of a specific transmission point.

As an additional example, a plurality of transmission points existing in one cell may be classified by an antenna port index of a reference signal (RS) of the cell. For instance, in case of a cell-specific RS, an antenna port 0 to 3 can be defined in one cell. A macro eNB corresponds to a CRS port 0 and 1, the RRH 1 corresponds to a CRC port 2, and an RRH 2 may correspond to a CRC port 3. In this case, although the macro eNB, the RRH 1, and the RRH 2 use an identical cell ID, the macro eNB, the RRH 1, and the RRH 2 can be identified by a CRC port. For instance, if an ICIC message related to the CRC port 2 is defined, it may directly mean that the ICIC message is related to the RRH 1.

As an additional example, a plurality of transmission points existing in one cell may be classified by a configuration of a channel state information-reference signal (CSI-RS). The CSI-RS is a reference signal used by a user equipment to calculate/determine a CSI. A plurality of CSI-RS configurations may be used in one cell. A plurality of the CSI-RS configurations can be classified in a manner that at least one selected from the group consisting of a position (transmission period, offset of a start point, transmission period, and the like) of CSI-RS transmission in terms of time, CSI-RS antenna port (antenna port 15 to 22) and a sequence used for generating the CSI-RS is differently configured. For instance, the RRH 1 corresponds to a CSI-RS configuration 0 and the RRH 2 may correspond to a CSI-RS configuration 1. In this case, if an ICIC message related to the CSI-RS configuration 0 is defined, it may directly means that the ICIC message is related to the RRH 1.

In this case, information for indicating that which transmission point is related to an ICIC information field can be included in an ICIC message including the ICIC information field. In this case, the information for indicating a transmission point can be defined as an additional field in the ICIC message or a reuse of a partial bit state of a legacy field.

Or, as mentioned in the foregoing description, the information for indicating the transmission point to which the ICIC message is related may be delivered to a neighboring cluster (or cell) via a separate signaling except the ICIC message.

Hence, if it is indicated that an ICIC message is related to the RRH 1, the ICIC message is valid for the RRH 1 only and interference coordination information for a different transmission point can be transceived between cells (or clusters) via a separate ICIC message.

For instance, when a cell 1, which is an aggressor, transmits such a downlink (DL) ICIC message as ABS configuration information and RNTP information, if the information indicating that the DL ICIC information is related to the RRH 1 is included in the ICIC message, having received the downlink ICIC message, a cell 2 may recognize it as the ABS configuration information or the RNTP information in downlink transmission of the RRH 1. In this case, DL ICIC information on a different transmission point of the cell 1 can be delivered to the cell 2 via a separate ICIC message.

Or, when a cell 1, which is an aggressor, transmits such an uplink (UL) ICIC message as HII information, if information indicating that the HII information is related to the RRH 1 is included in the ICIC message, having received the uplink ICIC message, a cell 2 may recognize it as the HII information in uplink transmission of the RRH 1. In this case, UL ICIC information on a different transmission point of the cell 1 can be delivered to the cell 2 via a separate ICIC message.

Or, when a cell 2, which is a victim, transmits such an uplink (UL) ICIC message as IOI, if information indicating that the IOI information is related to an RRH 4 is included in the ICIC message, having received the uplink ICIC message, a cell 1 may recognize it as the IOI information in uplink reception environment of the RRH 4. In this case, UL ICIC information on a different transmission point of the cell 2 can be delivered to the cell 1 via a separate ICIC message.

Or, the cell 2, which is a victim, may transmit a message for making a request for interference coordination in a specific transmission point of the cell 1, which is an aggressor, to the cell 1. For instance, the cell 2 may indicate that ABS status information is related to the RRH 1 of the cell 1 while transmitting the ABS status information to the cell 1. Moreover, when the cell 2 transmits information for making a request of reducing transmit power on a specific frequency domain, the cell 2 may indicate that corresponding frequency domain ICIC information is related to the RRH 1 of the cell 1. The ABS status information on a different transmission point and/or the information for making a request of reducing transmit power can be transmitted to the cell 1 via a separate ICIC message.

As mentioned in the foregoing description, as a result of defining inter-cluster interference coordination message capable of representing transmission point-specific (TP-specific) ICIC information, ICIC information on an individual transmission point within one transmission point group can be exchanged, thereby supporting a more precise ICIC operation. Although the aforementioned example is explained with a case that a plurality of transmission points within one cluster include an identical ID such as FIG. 7 (b) or FIG. 8, by which the scope of the present invention may be non-limited. In particular, the principle of the present invention, i.e., providing transmission point identification information together with an inter-cluster interference coordination message, can be identically applied to a case that pluralities of transmission points within one cluster form an individual cell as shown in FIG. 7 (a).

Embodiment 2

In transceiving an inter-cluster interference coordination message, the present embodiment corresponds to a method of performing interference coordination in consideration of a total amount of inter-cluster interference.

In performing inter-cluster interference coordination, if cluster-specific ICIC information and/or transmission point-specific ICIC information is considered only, a precise ICIC operation may be supported. Yet, total throughput and efficiency of a system may reduce as much as total transmit power of the corresponding cluster is reduced. According to the present embodiment, since an ICIC operation can be performed while the total transmit power (i.e., the total amount of interference in terms of a victim side) of transmission points belonging to one cluster is maintained as much as possible, the total throughput and efficiency of the system can be maintained/enhanced. Moreover, the present embodiment 2 may be simultaneously applied along with the embodiment 1 or may be independently applied.

Figure 9:
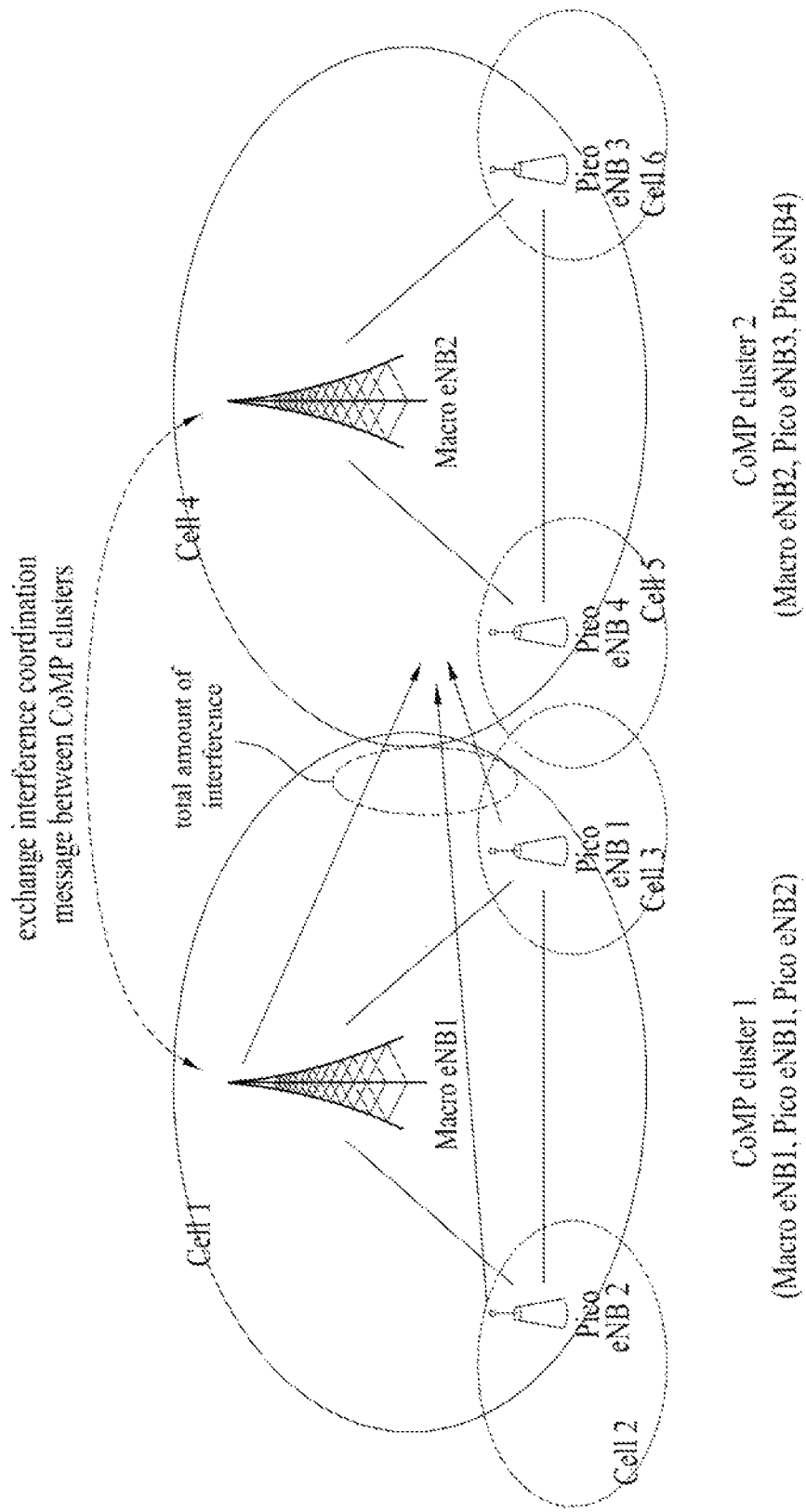
FIG. 9 is a diagram for another example of performing interference coordination between CoMP clusters.

FIG. 9 is a diagram for another example of performing interference coordination between CoMP clusters. In an example of FIG. 9, it may assume that transmission points belonging to a CoMP cluster 1 perform a CoMP operation with a joint transmission scheme. According to the joint transmission scheme, data for a specific user equipment existing in the CoMP cluster 1 can be simultaneously transmitted from a plurality of transmission points. As a specific example, it may assume that there is no DL traffic in a pico base station 1 (pico eNB 1) belonging to the CoMP cluster 1 and there exists a user equipment served by a macro base station 1 (macro eNB 1). In this case, both the pico base station 1 and the macro base station 1 can simultaneously transmit downlink data to the user equipment. In particular, it may be able to transmit DL data to a specific user equipment with a channel condition of high quality using transmit power of a transmission point, which does not temporarily have a DL traffic. In this case, it may consider that system performance is improved in terms of the CoMP cluster 1 only. Yet, interference for a neighboring cell (or cluster) may increase. In particular, if we compares a total amount of transmit power of the cluster 1 in case that the pico base station does not transmit with the total amount of transmit power in case that the pico base station performs additional transmission and there is no change in the transmit power of different transmission points, it is able to know that the total amount of transmit power is increased in a latter case and the amount of interference for a neighboring cell is increased.

The present invention may be able to plan more efficient interference coordination and system performance enhancement in a manner of performing interference coordination in consideration of the total amount of interference between CoMP clusters. For instance, according to the interference coordination between CoMP clusters, more efficient scheduling can be performed for a user equipment situating at a boundary of the CoMP cluster.

For instance, according to the example of FIG. 9, the CoMP cluster 1 can deliver a message including cluster-specific ICIC information to a CoMP cluster 2. For instance, the cluster-specific ICIC information may correspond to information for promising an operation for interference, which may affect an adjacent cluster by the cluster 1 in a cluster level. For instance, the CoMP cluster 1 transmits an RNTP message to the cluster 2 and may be then able to indicate that the RNTP message is not information on transmit power of an individual transmission point within the cluster 1 but information on the total amount of transmit power of the transmission points belonging to the cluster 1. In particular, the RNTP message informs that the total amount of transmit power of the transmission points belonging to the cluster 1 is not over a prescribed threshold on a specific frequency band(s) and may indicate that it is not able to secure the total amount of transmit power on a remaining frequency band(s).

In addition, the total amount of the transmit power of a cluster may correspond to the total amount of transmit power to which a weight for each of the transmission points belonging to the cluster is applied. In this case, the weight can be determined in a manner of considering a distance between the each of the transmission points belonging to the cluster and a cell that receives an ICIC message. For instance, according to an example of FIG. 9, since a pico base station 2 is farther from a victim cluster than a pico base station 1, although the pico base station 2 operates with higher transmit power than the pico base station 1, interference for the victim cluster is not significant. Hence, a relatively low weight can be given to the pico base station 2. Similarly, a relatively high weight can be given to the pico base station 1 compared to the pico base station 2. A weight for a macro base station can be determined by roughly an average of the weights for the pico base station 1 and 2.

Having received the aforementioned RNTP message, the CoMP cluster 2 can schedule user equipments served by the CoMP cluster 2 under an assumption that the total amount of interference (or the total amount of transmit power) of the CoMP cluster 1 is maintained below a prescribed threshold on a specific frequency.

In addition, according to the example of FIG. 9, the CoMP cluster 2 may transmit a message for making a request for coordination of the total amount of interference from the CoMP cluster 1 to the CoMP cluster 1. For instance, the CoMP cluster 2 may inform the CoMP cluster 1 of whether the total amount of interference of the CoMP cluster 1 is more or less compared to a predetermined threshold. Moreover, the CoMP cluster 2 may transmit information for making a request for reducing the total amount of transmit power on a specific frequency to the CoMP cluster 1.

Based on the RNTP for the total amount of transmit power of the above-mentioned CoMP cluster 1 and/or the request made by the CoMP cluster 2 for coordination of the total amount of interference, the total amount of transmit power of the CoMP cluster 1 can be coordinated/determined by a prescribed value. In addition, the CoMP cluster 1 can dynamically control the transmit power of the transmission points within the cluster under a condition that the determined total amount of transmit power is maintained. In particular, when inter-cluster interference coordination is semi-statically performed, if power control is dynamically used, it is possible to perform an optimized transmit power allocation in response to a traffic load change, an interference situation change, and the like.

In a situation that the total amount of transmit power of a cluster is determined by a prescribed value, an extent of interference experienced by a transmission point situating in the vicinity of an adjacent cluster (in particular, a transmission point situating in the vicinity of a boundary (e.g., pico base station 4 in FIG. 9)) may vary according to power allocation allocated to each of the transmission points within the cluster.

In order to solve the aforementioned problem, coordination for transmit power allocation between CoMP clusters can be additionally or independently performed. For instance, it may assume a case that the CoMP cluster 2 makes a report on strong interference in DL to the CoMP cluster 1. The report may include identification information of a transmission point strongly interfered in the CoMP cluster 2 and identification information of a transmission point causing strong interference in the cluster 1. Having received the report, the CoMP cluster 1 reduces the transmit power of the transmission point, which has been reported as the transmission point causing the interference, while maintaining the total amount of transmit power of the cluster. The CoMP cluster 1 may adaptively control transmit power allocation within the cluster in a manner of increasing the transmit power of a different transmission point instead.

For instance, according to the example of FIG. 9, if the total amount of transmit power of the CoMP 1 cluster is determined by A, assume a case that A/2 transmit power is allocated to a macro base station and A/4 transmit power is allocated to a pico base station 1 and 2, respectively. In this case, the CoMP cluster 2 may deliver a report, which includes information that a pico eNB 4 of the CoMP cluster 2 is strongly interfered and/or information that a pico eNB 1 of the CoMP cluster 1 causes strong interference, to the CoMP cluster 1. In this case, A/2 transmit power is allocated to the macro base station, A/8 transmit power is allocated to the pico base station 1, and 3 A/8 transmit power is allocated to the pico base station 2 in the CoMP cluster 1 to control the transmit power allocation.

In this case, the transmit power allocation can be performed in a manner of weighting to each of the transmission points of the CoMP cluster 1. For instance, it may assume a case that a weighted value w1 is given to a pico eNB 1, which is closest to the CoMP cluster 2 and a weighted value w2 is given to a pico eNB 2 where w1=2*w2. This sort of weighting is appropriate for a case that the eNB 1 plays a role of affecting interference increase as much as twice compared to the pico eNB 2 in terms of the interference increase received by the CoMP cluster 2 in case that the transmit power is identically increased for the pico eNB 1 and 2. Hence, the total amount of transmit power is maintained and appropriate transmit power allocation can be performed in the CoMP cluster 1 in a manner of considering the weighted value of each of the transmission points.

In addition, according to the example of FIG. 9, the CoMP cluster 1 may transmit a message for asking the CoMP cluster 2 whether a new power allocation solves the interference problem of the CoMP cluster 2. Having received the inquiry message, the CoMP cluster 2 determines whether the interference received by the CoMP cluster 2 is acceptable according to the new power allocation of the CoMP cluster 1 and may be then able to deliver a result of the determination to the CoMP cluster 1. If the CoMP cluster 2 feedbacks that the interference in accordance with the new power allocation of the CoMP cluster 1 is not acceptable to the CoMP cluster 1, the CoMP cluster 1 may re-control the power allocation in a manner of further reducing the transmit power of the transmission point, which is close to the CoMP cluster 2. Or, the CoMP cluster 1 may perform the interference coordination (or transmit power coordination) in a manner of reducing the total amount of transmit power.

In the aforementioned examples, a method of performing the inter-cluster interference coordination and a method of performing the cluster transmit power coordination proposed by the present invention have been explained based on the RNTP message for a DL frequency resource transmitted by an aggressor cluster, by which the scope of the present invention may be non-limited. In particular, the principle of the present invention, i.e., inter-cluster interference coordination is performed based on the total amount of transmit power within one CoMP cluster, can be identically applied to an ICIC operation such as ABS configuration for a DL time resource and an ICIC operation such as HII, IOI, and the like for an UL resource as well.

For instance, in the example of FIG. 9, having received HII on a specific resource (a resource defined in time domain and/or frequency domain) from the CoMP cluster 2, the CoMP cluster 1 may perform an ICIC operation to reduce the total amount of transmit power in the corresponding resource or the transmit power allocated to a transmission point, which is situating at a position capable of considerably affecting the CoMP cluster 2. For instance, the CoMP cluster 1 may enable a transmission point (i.e., a transmission point positioned at the most distant from the CoMP cluster 2 or a transmission point serving user equipments in a relatively narrow coverage only) causing a smallest interference in terms of the CoMP cluster 2 to intensively perform scheduling. Or, the CoMP cluster 1 may enable user equipments capable of performing communication with a minimum transmit power or user equipments connected to a pico base station having a relatively narrow coverage to be intensively scheduled. Meanwhile, for a specific resource to which a low interference is indicated, the CoMP cluster 1 may schedule a user equipment connected to a macro base station requiring high transmit power or may enable a transmission point close to the CoMP cluster 2 to perform scheduling.

Embodiment 3

The present embodiment relates to a method of considering an ICIC operation according to the aforementioned embodiments in performing a CoMP operation. For instance, it may consider an amount of interference for a neighboring cell (or cluster) in case of determining whether to perform a CoMP joint transmission operation.

As mentioned in the foregoing description, when a CoMP joint transmission is performed additionally using power of a transmission point of a low traffic in one cluster, downlink data transmission of high quality can be provided to a specific user equipment. Yet, the CoMP joint transmission may increase an amount of interference for a neighboring cell (or cluster) and then may deteriorate overall performance of a system.

In order to solve the aforementioned problem, the present embodiment proposes to perform a joint transmission (JT) only when a performance gain obtained by the JT is significantly higher than a performance loss due to the increase of the amount of interference. For instance, a CoMP cluster may define a metric as follows in Formula 15.

$$M = R_{JT} - \alpha \cdot P_{JT}$$ [Formula 15]

In the Formula 15, M corresponds to a CoMP JT metric. Transmit power of each transmission point is determined and user equipments may be paired to make a value of the M to be maximized. In the Formula 15, $R_{JT}$ corresponds to a transmission rate capable of being obtained in case of performing a CoMP JT and $P_{JT}$ corresponds to transmit power in case of performing the CoMP JT. $\alpha$ is a coefficient for penalizing (i.e., reflecting an amount of interference for a neighboring cell) transmit power for a JT operation. For instance, the transmit power for the JT operation may correspond to the total amount of transmit power of each transmission point to which a weighted value according to a distance is applied in a manner of reflecting the distance between each of the transmission points participating in the JT and the neighboring cell (or cluster).

As mentioned in the foregoing description, in case of performing a method of performing interference coordination between transmission point groups (or CoMP clusters) proposed by the present invention, the method can be implemented in a manner that items explained in various embodiments of the present invention are independently applied or two or more embodiments are simultaneously applied. For clarity, duplicated contents are omitted.

Figure 10:
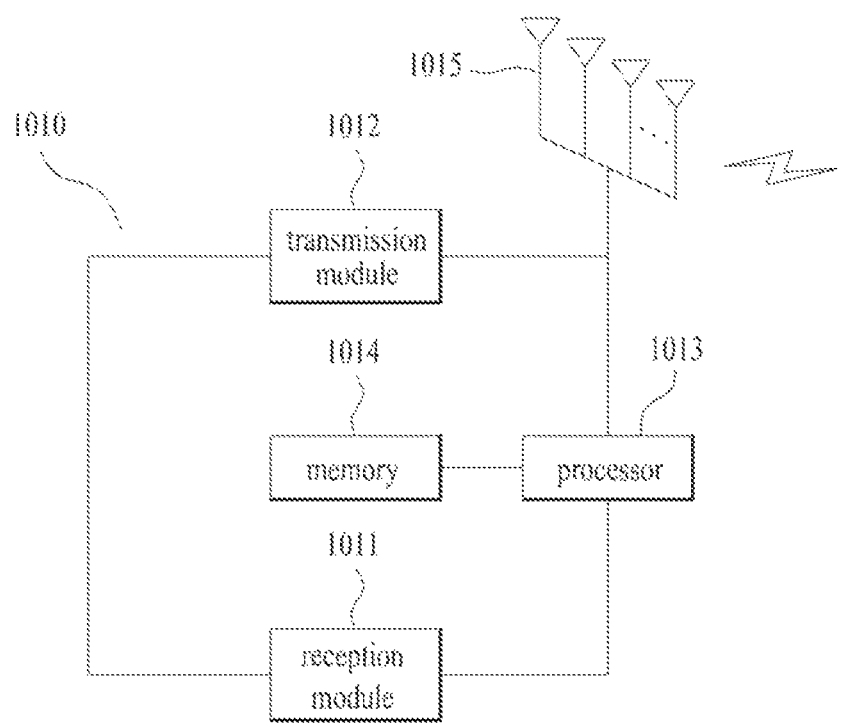
FIG. 10 is a diagram for a configuration of a device performing interference coordination according to the present invention.

FIG. 10 is a diagram for a configuration of a device performing interference coordination according to the present invention.

Referring to FIG. 10, an interference coordination device 1010 according to the present invention may include a reception module 1011, a transmission module 1012, a processor 1013, a memory 1014, and a plurality of antennas 1015. A plurality of the antennas 1015 indicates a base station device supporting MIMO transmission and reception. The reception module 1011 can receive various signal, data, and information from external. The transmission module 1012 can transmit various signals, data, and information to the external. The processor 1013 can control overall operation of the interference coordination device 1010.

The reception module 1011 of the interference coordination device 1010 according to one embodiment of the present invention is configured to receive an interference coordination message from a different transmission point group and the transmission module 1012 can be configured to transmit an interference coordination message to a different transmission point group. And, the processor 1013 can be configured to control exchange of an interference coordination message between transmission point groups via the reception module 1011 and the transmission module 1012. As mentioned earlier in the embodiments, the interference coordination message may include interference coordination information on an individual unit of a transmission point and/or a group unit of the transmission point.

In an example of FIG. 10, an interference coordination device 1010 can be explained as a device for controlling a transmission point group. For instance, the device for controlling the transmission point group may correspond to one transmission point of the transmission point group or may be implemented by a separate control device irrespective of the transmission point.

Besides, the processor 1013 of the interference coordination device 1010 performs a function of calculating information received by the interference coordination device 1010, information to be transmitted to the external and the like. The memory 1014 can store the calculated information and the like for a predetermined time and may be replaced with such a configuration element as a buffer (not depicted) or the like.

Detail configuration of the aforementioned interference coordination device can be implemented in a manner that the aforementioned items explained in various embodiments of the present invention are independently applied or two or more embodiments are simultaneously applied. For clarity, duplicated contents are omitted.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

Detailed explanation on the preferred embodiment of the present invention disclosed as mentioned in the foregoing description is provided for those in the art to implement and execute the present invention. While the present invention has been described and illustrated herein with reference to the preferred embodiments thereof, it will be apparent to those skilled in the art that various modifications and variations can be made therein without departing from the spirit and scope of the invention. For instance, those skilled in the art can use each component described in the aforementioned embodiments in a manner of combining it with each other. Hence, the present invention may be non-limited to the aforementioned embodiments of the present invention and intends to provide a scope matched with principles and new characteristics disclosed in the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Industrial Applicability

The aforementioned embodiments of the present invention can be applied to various mobile communication systems.

What is claimed is:

1. A method of performing interference coordination in a wireless communication system, comprising:
    transmitting an interference coordination message, by a first transmission point groups, to a second transmission point group,
    wherein one transmission point group comprises a plurality of transmission points,
    wherein the interference coordination message is transmitted by at least one of the transmission points in the first transmission point group to a east one of the transmission points in the second transmission point group,
    wherein the interference coordination message comprises an interference coordination information on a unit of an individual transmission point within the first transmission point group, an interference coordination information on a unit of all transmission points within the first transmission point group, an information on a total amount of transmit power of a plurality of the transmission points within the first transmission point group,
    wherein the total amount of transmit power is determined based on a weighted value for plurality of the transmission points, and
    wherein the weighted value is determined based on a distance between each of a plurality of the transmission points within the first at transmission point group and the second transmission point group.

2. The method of claim 1, wherein the interference coordination message further comprises identification information on the individual transmission point.

3. The method of claim 2, wherein the identification information comprises at least one selected from the group consisting of an identifier of the transmission point, an antenna port index of a reference signal, and a configuration index of a channel state information-reference signal.

4. The method of claim 2, wherein the transmission points within the one transmission point group comprise an identical cell identifier.

5. The method of claim 1, wherein allocation of the transmit power allocated to a plurality of the transmission points is controlled while the total amount of transmit power is maintained in the first transmission point group.

6. The method of claim 1, wherein a cooperative communication performed by a plurality of the transmission points within the first transmission point group is performed in case that a performance gain obtained by the joint transmission (JT) is higher than a performance loss due to the increase of the amount of interference.

7. The method of claim 1, wherein the interference coordination message comprises at least one selected from the group consisting of ABS (almost blank subframe) configuration information, ABS status information, RNTP (relative narrowband transmission power) information, IOI (interference overhead indication) information, and HII (high interference indication) information.

8. A device performing interference coordination in a wireless communication system, comprising:
    a transmission module configured to transmit an interference coordination message to a different transmission point group;
    a reception module configured to receive the interference coordination message from the different transmission point group; and
    a processor configured to control the transmission module to transmit the interference coordination message to the different transmission point group,
    wherein one transmission point group comprises a plurality of transmission points,
    wherein the interference coordination message is transmitted to at least one of the transmission points in the different transmission point group,
    wherein the interference coordination message comprises an interference coordination information on a unit of an individual transmission point within one transmission point group and the interference coordination information on a unit of all transmission points within the one transmission point group and an information on a total amount of transmit power of a plurality of the transmission points within the one transmission point group,
    wherein the total amount of transmit power is determined based on a weighted value for a, plurality of the transmission points, and
    wherein the weighted value is determined based on a distance between each of a plurality of the transmission points within the one transmission point group and a different transmission point group.

* * * * *